United States Patent [19]

Jacob

[11] Patent Number: 5,733,188
[45] Date of Patent: Mar. 31, 1998

[54] SPEED OF LABORATORY FUME HOOD SASH OPENING MONITOR AND INDICATOR

[75] Inventor: Steven D. Jacob, Crystal Lake, Ill.

[73] Assignee: Landis & Staefa, Inc., Buffalo Grove, Ill.

[21] Appl. No.: 694,436

[22] Filed: Aug. 12, 1996

[51] Int. Cl.[6] .................................................. B08B 15/02
[52] U.S. Cl. ................................................ 454/56; 454/61
[58] Field of Search .......................................... 454/56, 61

[56] References Cited

U.S. PATENT DOCUMENTS

| | | |
|---|---|---|
| 4,706,553 | 11/1987 | Sharp et al. .................. 454/61 |
| 4,934,256 | 6/1990 | Moss et al. ................... 454/61 |
| 5,215,497 | 6/1993 | Drees ........................... 454/61 |

*Primary Examiner*—Harold Joyce
*Attorney, Agent, or Firm*—Greer, Burns & Crain, Ltd.

[57] ABSTRACT

Apparatus for monitoring the speed of movement of at least one sash door of a laboratory fume hood is disclosed. The speed of movement of a sash door is detected and an alarm signal is generated if the speed of movement exceeds a predetermined value while increasing the size of the uncovered opening of the fume hood.

13 Claims, 9 Drawing Sheets

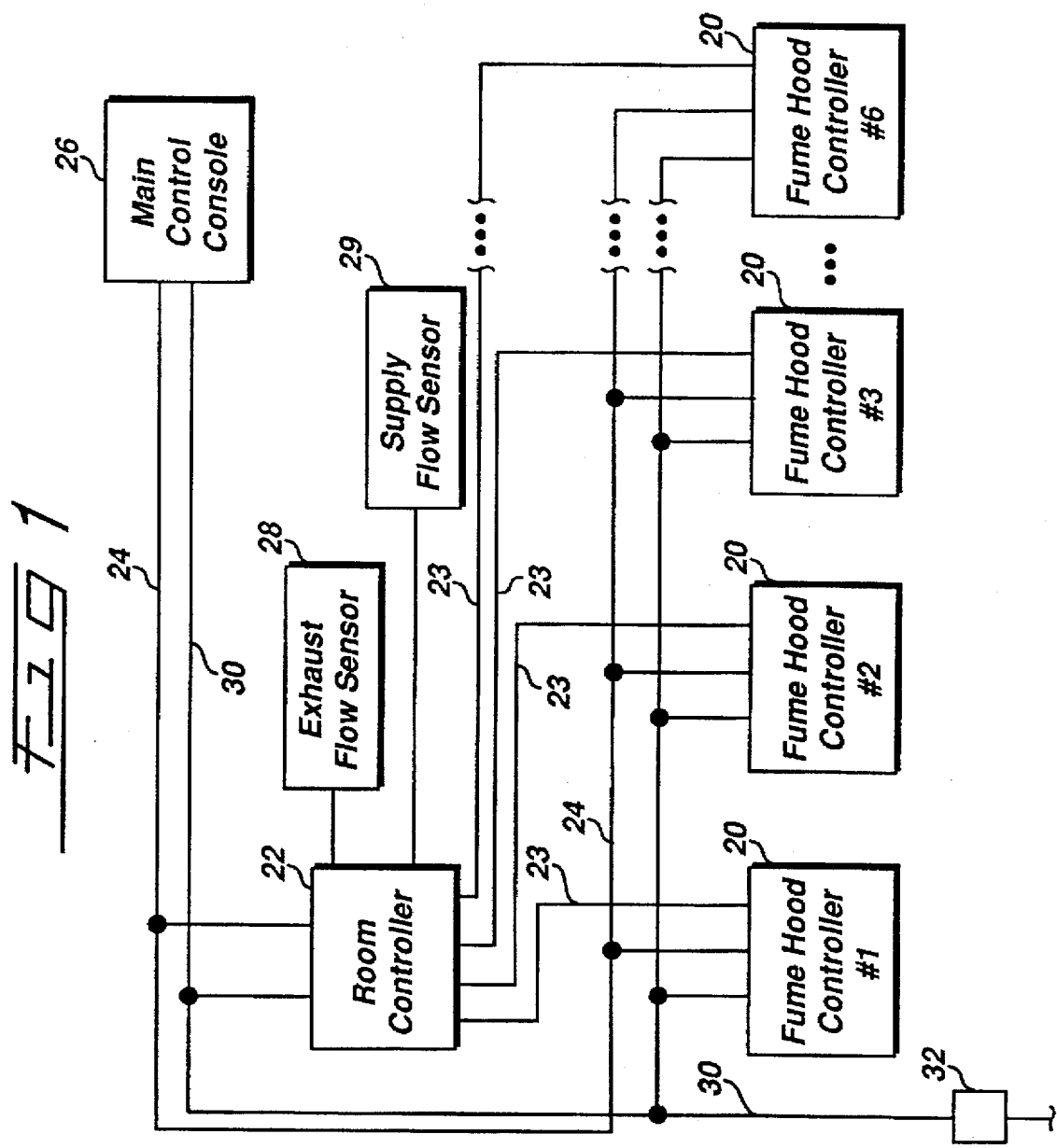

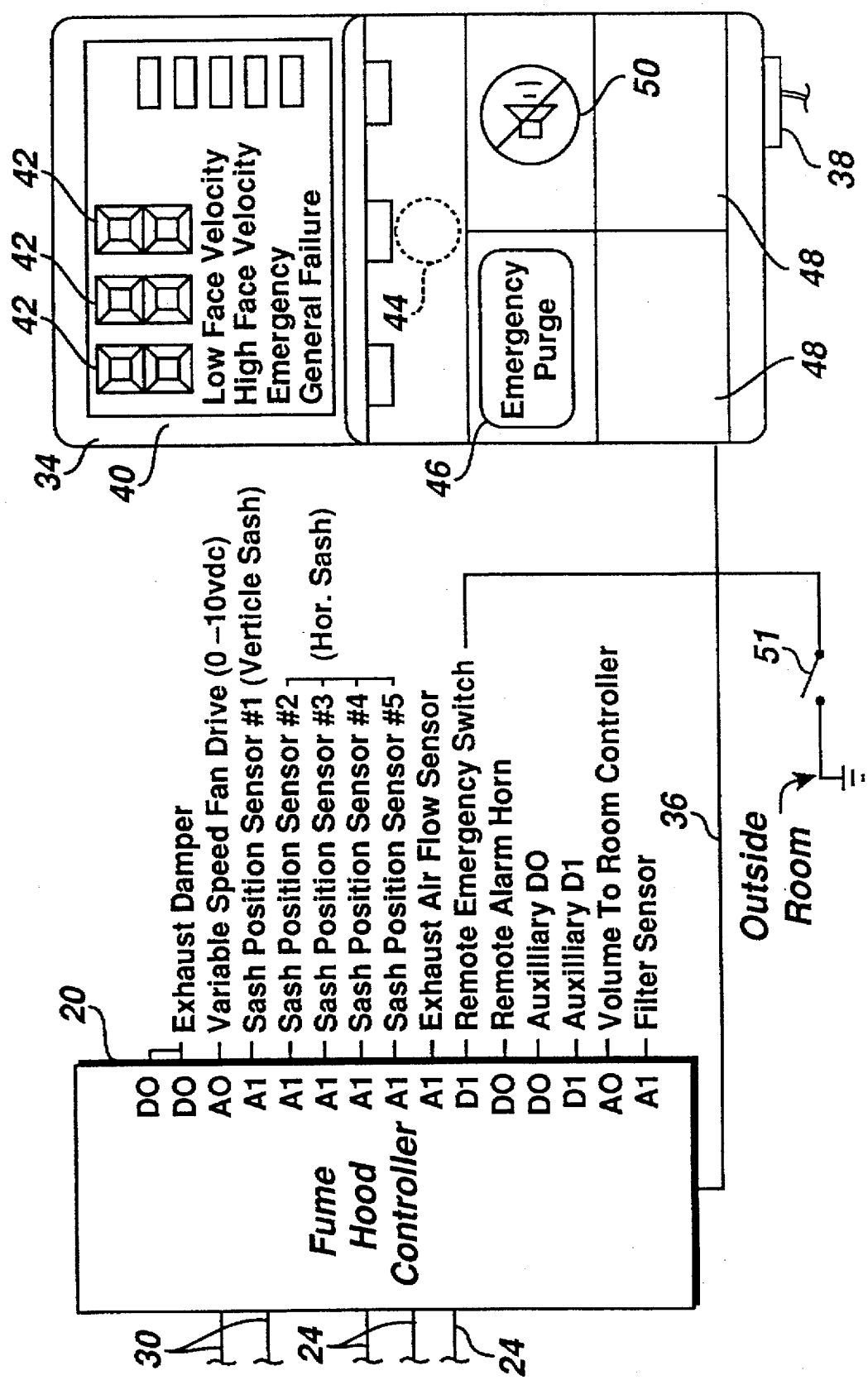

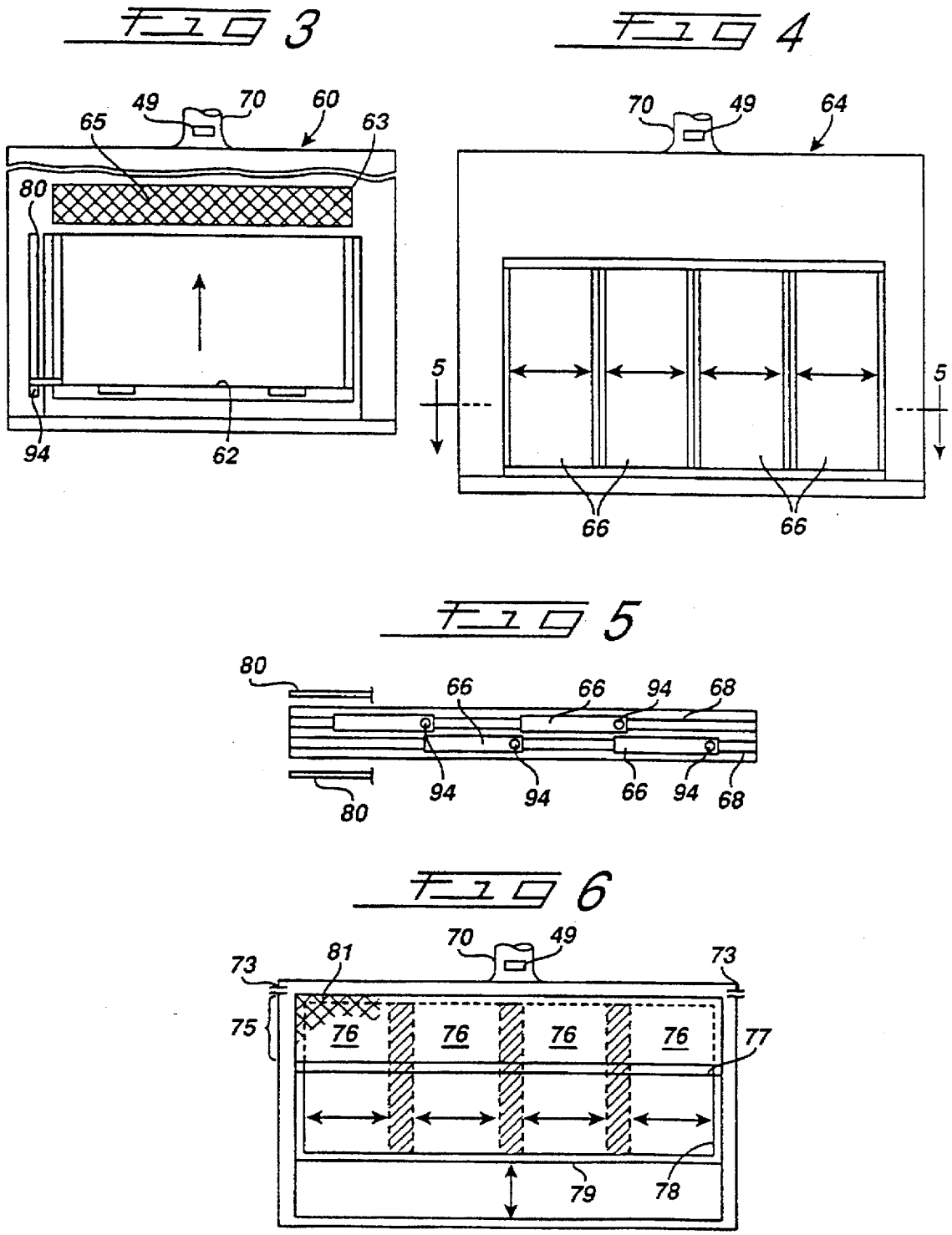

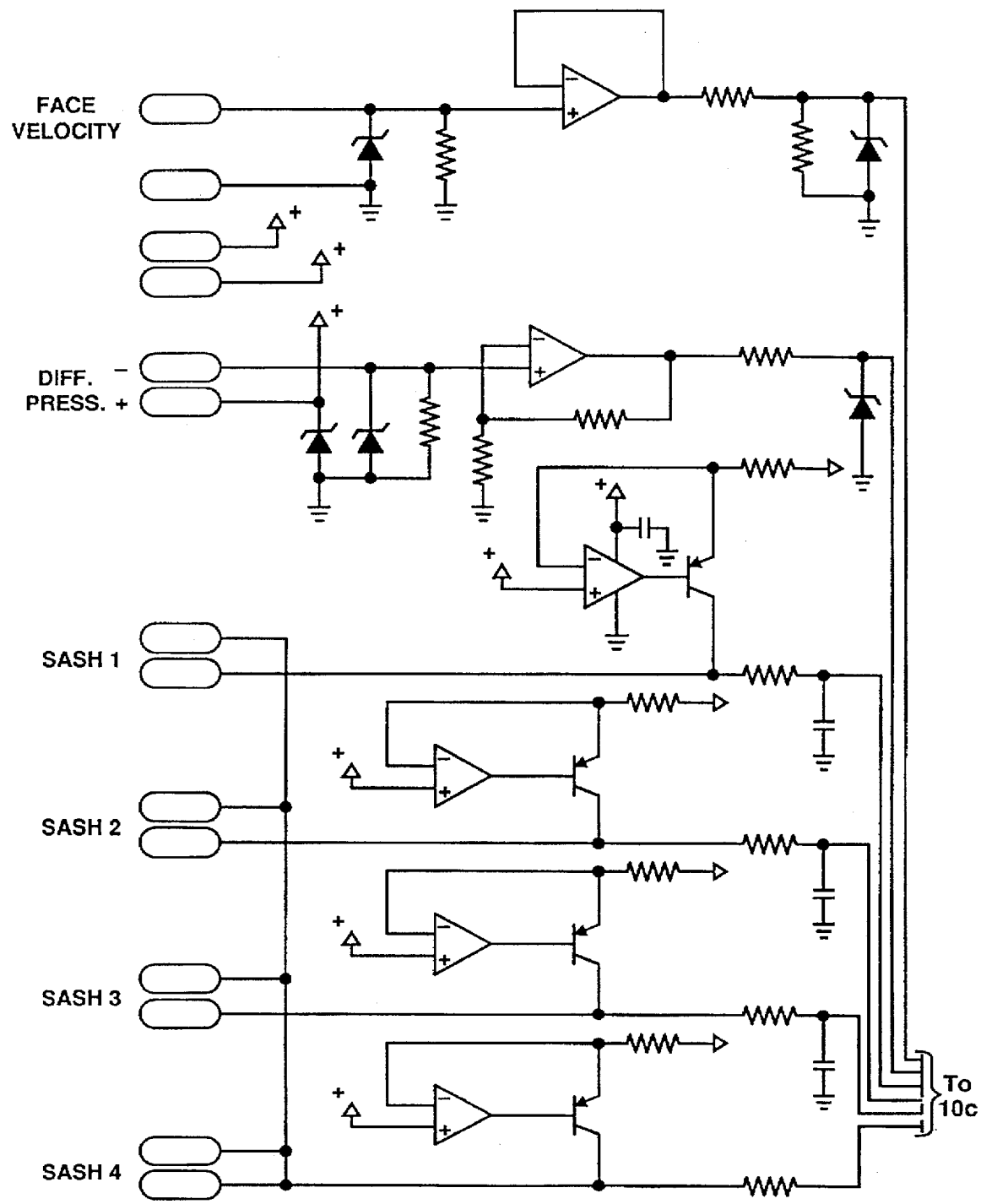

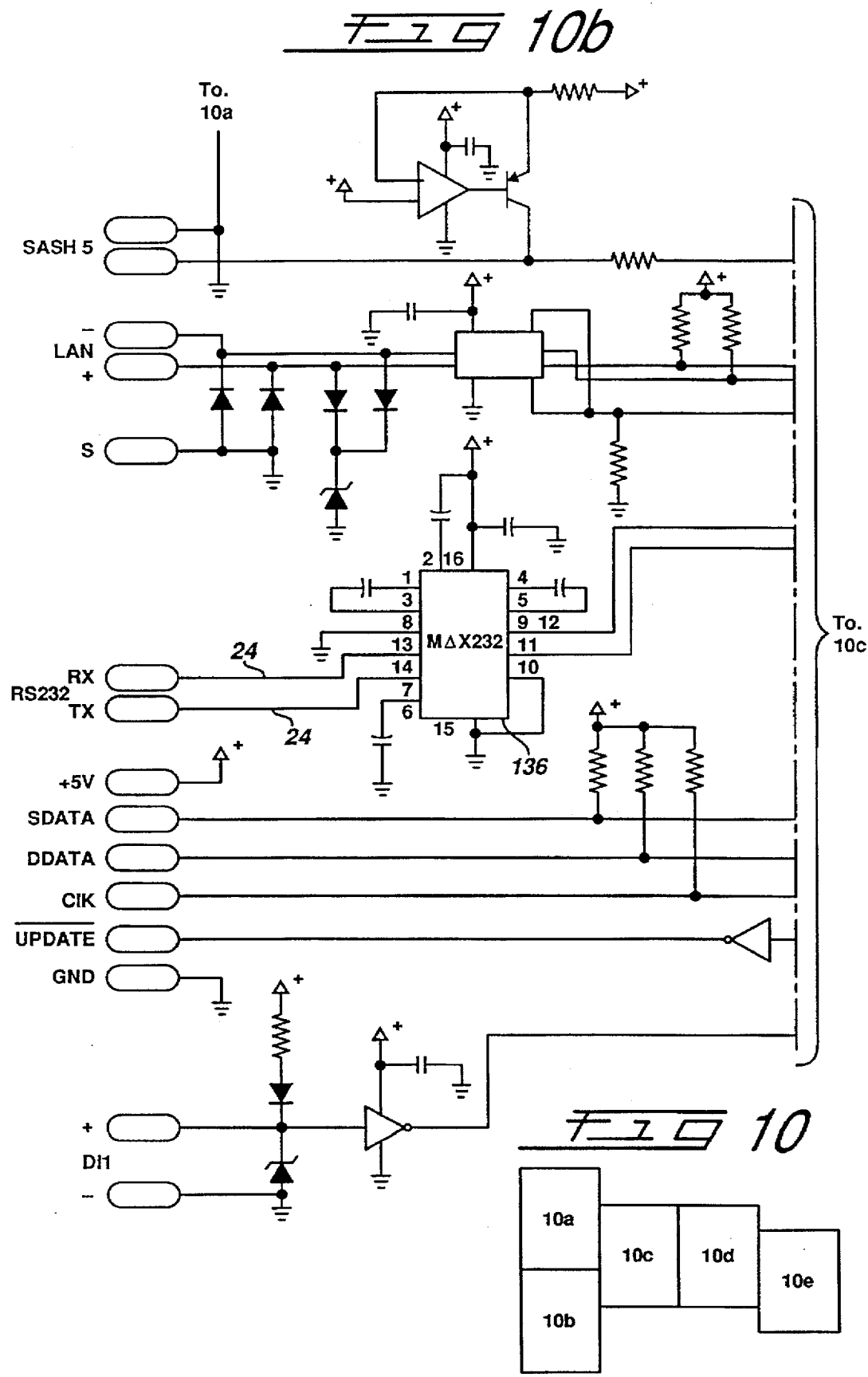

SPEED OF LABORATORY FUME HOOD SASH OPENING MONITOR AND INDICATOR

The present invention relates generally to the control of the ventilation of laboratory fume hoods, and more particularly to an apparatus for determining the speed of movement of sash doors of such fume hoods, and for providing alarm signals responsive to the speed and possibly the direction of movement of such sash doors.

Fume hoods are utilized in various laboratory environments for providing a work place where potentially dangerous chemicals are used, with the hoods comprising an enclosure having moveable doors at the front portion thereof which can be opened in various amounts to permit a person to gain access to the interior of the enclosure to conduct experiments and the like. The enclosure is typically connected to an exhaust system for removing any noxious fumes so that the person will not be exposed to them while performing work in the hood.

Fume hood controllers which control the flow of air through the enclosure have become more sophisticated in recent years, and are now able to more accurately maintain the desired flow characteristics to efficiently exhaust the fumes from the enclosure as a function of the desired average face velocity of the opening of the fume hood. The average face velocity is generally defined as the flow of air into the fume hood per square foot of open face area of the fume hood, with the size of the open face area being dependent upon the position of one or more moveable sash doors (often only referred to as a "sash") that are provided on the front of the enclosure or fume hood, and in most types of enclosures, the mount of bypass opening that is provided when the door or doors are closed.

The fume hoods are exhausted by an exhaust system that includes a blower that is capable of being driven at variable speeds to increase or decrease the flow of air from the fume hood to compensate for the varying size of the opening or face. Alternatively, there may be a single blower connected to the exhaust manifold that is in turn connected to the individual ducts of multiple fume hoods, and dampers may be provided in the individual ducts to control the flow from the individual ducts to thereby modulate the flow to maintain the desired average face velocity.

The sash doors of such fume hoods can be opened by raising them vertically, often referred to as the sash position, or some fume hoods have a number of doors that are mounted for sliding movement in typically two sets of vertical tracks. There are even doors that can be moved horizontally and vertically, with the tracks being mounted in a frame assembly that is vertically movable.

Regardless of the direction of movement of the sash doors, i.e., whether they open horizontally or vertically, the possibility of leakage of air from the inside of the fume hood increases as a function of the speed of movement of the sash doors during an opening operation. Thus, it is highly desirable that the sash doors be opened at a relatively moderate speed so that fumes from inside the fume hood will not escape during an opening operation.

Accordingly, it is a primary object of the present invention to provide a sash opening monitoring apparatus for providing an alarm indication in the event that a sash is being opened too rapidly.

It is another object of the present invention to provide such a monitoring apparatus which is easily implemented in systems that have sash position sensors and processing means associated with the sash position sensors.

Another object of the present invention is to provide such a monitoring apparatus that is adapted to provide either an audible and/or a visible alarm if a sash is opened too rapidly.

These and other objects will become apparent upon reading the following detailed description of the present invention, while referring to the attached drawings, in which:

FIG. 1 is a schematic block diagram of apparatus of the present invention shown integrated with a room controller of a heating, ventilating and air conditioning monitoring and control system of a building;

FIG. 2 is a block diagram of a fume hood controller, shown connected to an operator panel, the latter being shown in front elevation;

FIG. 3 is a diagrammatic elevation of the front of a representative fume hood having a vertically operable sash door, and a by-pass opening located above the front face;

FIG. 4 is a diagrammatic elevation of the front of a representative fume hood having horizontally operable sash doors;

FIG. 5 is a cross section taken generally along the line 5—5 of FIG. 4;

FIG. 6 is a diagrammatic elevation of the front of a representative combination sash fume hood having horizontally and vertically operable sash doors;

Figure 7:
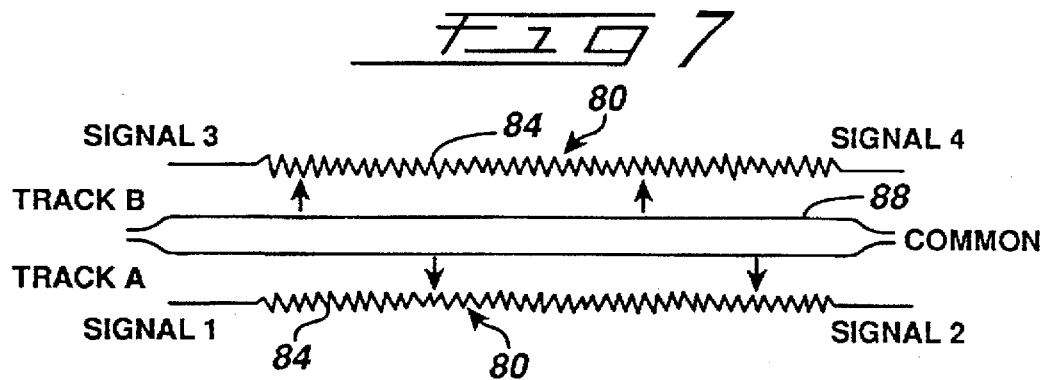
FIG. 7 is an electrical schematic diagram of a plurality of door sash position indicating switching means.

FIGS. 10a, 10b, 10c, 10d and 10e, which if connected together, comprise the schematic diagram of the electrical circuitry for the fume hood controller means embodying the present invention.

DETAILED DESCRIPTION

It should be generally understood that a fume hood controller controls the flow of air through the fume hood in a manner whereby the effective size of the total opening to the fume hood, including the portion of the opening that is not covered by one or more sash doors will have a relatively constant average face velocity of air moving into the fume hood. This means that regardless of the area of the uncovered opening, an average volume of air per unit of surface area of the uncovered portion will be moved into the fume hood. This protects the persons in the laboratory from being exposed to noxious fumes or the like because air is always flowing into the fume hood, and out of the exhaust duct, and the flow is preferably controlled at a predetermined rate that can vary, but which is generally within the range of approximately 60 to 150 cubic feet per minute per square foot of effective surface area of the uncovered opening.

The controllers attempt to maintain an average face velocity even during a transient condition, with the effectiveness being a function of the response time of the system as well as other factors. One very significant factor is the speed of movement of a sash door during opening thereof by a person who wishes to gain access to the interior of the fume hood. If the sash door is rapidly opened, then the system has difficulty in maintaining an average face velocity because the increase in the quantity of air required by the system is often beyond the supply capabilities so that it takes a few seconds for the system to return to the desired average face velocity condition. Also, rapid movement of the sash door will often create a turbulent condition which will cause fumes from inside of the fume hood to leak or spill out of the opening, which is quite undesirable.

Broadly stated, the present invention is directed to a sash door opening monitor for a fume hood where the speed of movement of the sash door during opening thereof is monitored and if too fast, creates an alarm condition. The present invention can be utilized in a fume hood control system or in a fume hood monitor system. It is only necessary that there be sash position sensors provided and a processing means for calculating velocity from the detected sash positions. The present invention is particularly adapted for a fume hood control system of the type as set forth in U.S. Pat. No. 5,470,275, assigned to the same assignee as the present invention, for the reason that sash sensors are an integral part of the control system and the system includes processing means for generating control signals for maintaining an average face velocity condition, among other functions performed, and it is this hardware that is available for detecting the speed of movement of sash doors during opening and using the sensed position of the sash doors over time to calculate the speed of movement of the doors.

As will be understood, the present invention is adapted for use with fume hoods having vertical doors, horizontal sash doors, as well as combinations thereof, and by virtue of the fact that the control system is adapted to calculate the size of the uncovered opening of a sash door utilizing the position sensors of the various doors, it can be easily determined whether the doors are being opened or closed. It is known that horizontal moving sash doors generally do not create a leakage condition as easily as vertically moving sash doors. With vertical opening doors, it has been found that if the sash door is opened at a speed that is approximately one foot per second, then a leakage condition is usually not experienced. However, if the movement is approximately 1.5 feet per second or greater, then there is a tendency for a leakage condition to occur.

Turning now to the drawings, and particularly FIG. 1, a block diagram is shown of several fume hood controllers 20 interconnected with a room controller 22 and a main control console 26. The fume hood controllers 20 are interconnected with the room controller 22 and the main control console 26 in a local area network illustrated by line 24 which may be a multiconductor cable or the like. The room controller and the main control console 26 are typically part of the building main HVAC system in which the laboratory rooms containing the fume hoods are located. The fume hood controllers 20 are provided with power through line 30, which is at the proper voltage via a transformer 32 or the like.

The room controller 22 preferably is of the type which is at least capable of providing a variable air volume to the room, and may be a Landis & Gyr, Inc. System 600 Building Automation System (BAS) controller. The room controller 22 is capable of communicating over the LAN lines 24. The room controller preferably is a System 600 BAS controller and is a commercially available controller for which extensive documentation exists. The User Reference Manual for the System 600 BAS controller is specifically incorporated by reference herein.

The room controller 22 receives signals via lines 23 from each of the fume hood controllers 20 that provides an analog input signal indicating the volume of air that is being exhausted by each of the fume hood controllers 20 and a comparable signal from an exhaust flow sensor 28 that provides an indication of the volume of air that is being exhausted through the main exhaust system apart from the fume hood exhausts. These signals coupled with a signal from a supply flow sensor 29 which indicates the flow of air coming into the room enables the room controller to calculate the difference of the total into the room and the total flow being exhausted from the room and maintain a preset difference. This enables the differential pressure within the room to be controlled at a slightly lower pressure than a reference space outside the room, i.e., preferably within the range of about 0.01 to about 0.1 inches of water, which results in the desirable lower pressure of the room relative to the reference space. However, it is not so low that it prevents persons inside the laboratory room from opening the doors to escape in the event of an emergency, particularly if the doors open outwardly from the room. Also, in the event the doors open inwardly, the differential pressure will not be so great that it will pull the door open due to excessive force being applied due to such pressure.

Referring to FIG. 2, a fume hood controller 20 is illustrated with its input and output connector ports being identified, and the fume hood controller 20 is connected to an operator panel 34. It should be understood that each fume hood will have a fume hood controller 20 and that an operator panel will be provided with each fume hood controller. The operator panel 34 is provided for each of the fume hoods and it is interconnected with the fume hood controller 20 by a line 36 which preferably comprises a multi-conductor cable having eight conductors. The operator panel has a connector 38, such as a 6 wire RJ11 type telephone jack for example, into which a lap top personal computer or the like may be connected for the purpose of inputting information relating to the configuration or operation of the fume hood during initial installation, or to change certain operating parameters if necessary. The operator panel 34 is preferably mounted to the fume hood in a convenient location adapted to be easily observed by a person who is working with the fume hood.

The fume hood controller operator panel 34 preferably includes a liquid crystal display 40, which when selectively activated, provides the visual indication of various aspects of the operation of the fume hood, including three digits 42 which provide the average face velocity. The display 40 illustrates other conditions such as low face velocity, high face velocity and emergency condition and an indication of controller failure. The operator panel may have an audible horn 44 and an emergency purge switch 46 which an operator can press to purge the fume hood in the event of an accident. The operator panel has two auxiliary switches 48 which can be used for various customer needs, including day/night modes of operation. It is contemplated that night time mode of operation would have a different and preferably reduced average face velocity, presumably because no one would be working in the area and such a lower average face velocity would conserve energy. An alarm silence switch 50 is also preferably provided to extinguish the horn or visible alarm.

Fume hoods come in many different styles, sizes and configurations, including those which have a single sash door or a number of sash doors, with the sash doors being moveable vertically, horizontally or in both directions.

Referring to FIG. 3, there is shown a fume hood, indicated generally at 60, which has a vertically operated sash door 62 which can be moved to gain access to the fume hood and which can be moved to the substantially closed position as shown. Fume hoods are generally designed so that even when a door sash such as door sash 62 is completely closed, there is still some amount of opening into the fume hood, such as opening 63, through which air can pass. This opening 63 is generally referred to as the by-pass area and it can be determined so that its effect can be taken into consideration in controlling the flow of air into the fume hood. Some types of fume hoods have a by-pass opening that is located above the door sash while others are below the same. In some fume hoods, the first amount of movement of a sash door will increase the opening at the bottom of the door shown in FIG. 3, for example, but as the door is raised, it will merely cut off the by-pass opening so that the size of the total opening of the fume hood is maintained relatively constant for perhaps the first one-fourth amount of movement of the sash door 62 through its course of travel and ignoring any effect of a grille 65 which is provided to overlie the by-pass area.

Other types of fume hoods may include several horizontally moveable sash doors 66 such as shown in FIGS. 4 and 5, with the doors being movable in upper and lower pairs of adjacent tracks 68. When the doors are positioned as shown in FIGS. 4 and 5, the fume hood opening is completely closed and an operator may move the doors in the horizontal direction to gain access to the fume hood. Both of the fumes hoods 60 and 64 have an exhaust duct 70 which generally extends to an exhaust system which may be that of the HVAC apparatus previously described.

Referring to FIG. 6, there is shown a combination fume hood which has horizontally movable doors 76 which are similar to the doors 66, with the fume hood 74 having a frame structure 78 which carries the doors 76 in suitable tracks and the frame structure 78 is also vertically movable in the opening of the fume hood.

The illustration of FIG. 6 has portions removed as shown by the break lines 73 which is intended to illustrate that the height of the fume hood may be greater than is otherwise shown so that the flame structure 78 may be raised sufficiently to permit adequate access to the interior of the fume hood by a person. There is generally a by-pass area which is identified as the vertical area 75, and there is typically a top lip portion 77 which may be approximately 2 inches wide. This dimension is preferably defined so that its effect on the calculation of the open face area can be taken into consideration.

While not specifically illustrated, other combinations are also possible, including multiple sets of vertically moveable sash doors positioned adjacent one another along the width of the fume hood opening, with two or more sash doors being vertically moveable in adjacent tracks, much the same as residential casement windows.

In accordance with an important aspect of the fume hood controller 20, it is adapted to operate the fume hoods of various sizes and configurations as has been described, and it is also adapted to be incorporated into a laboratory room where several fume hoods may be located and which may have exhaust ducts which merge into a common exhaust manifold which may be a part of the building HVAC system. A fume hood may be a single self-contained installation and may have its own separate exhaust duct. In the event that a single fume hood is installed, it is typical that such an installation would have a variable speed motor driven blower associated with the exhaust duct whereby the speed of the motor and blower can be variably controlled to thereby adjust the flow of air through the fume hood. Alternatively, and most typically for multiple fume hoods in a single area, the exhaust ducts of each fume hood are merged into one or more larger exhaust manifolds and a single large blower may be provided in the manifold system. In such types of installations, control of each fume hood is achieved by means of separate dampers located in the exhaust duct of each fume hood, so that variation in the flow can be controlled by appropriately positioning the damper associated with each fume hood.

The fume hood controller is adapted to control virtually any of the various kinds and styles of fume hoods that are commercially available, and to this end, it has a number of input and output ports (lines, connectors or connections, all considered to be equivalent herein) that can be connected to various sensors that may be used with the controller. As shown in FIG. 2, it has digital output or DO ports which interface with a digital signal/analog pressure transducer with an exhaust damper as previously described, but it also has an analog voltage output port for controlling a variable speed fan drive if it is to be installed in that manner. There are five sash position sensor ports for use in sensing the position of both horizontally and vertically moveable sashes and there is also an analog input port provided for connection to an exhaust air flow sensor 49. A digital input port for the emergency switch is provided and digital output ports for outputting an alarm horn signal as well as an auxiliary signal is provided. An analog voltage output port is also provided for providing a volume of flow signal to the room controller 22. In certain applications where the exhaust air flow sensor is not provided, a wall velocity sensor indicative of face velocity may be utilized and an input port for such a signal is provided, but the use of such sensors is generally considered to be less accurate and is not the preferred embodiment. With these various input and output ports, virtually any type of fume hood can be controlled in an effective and efficient manner.

Figure 8:
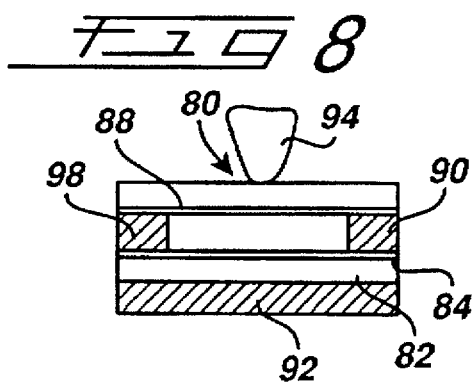
FIG. 8 is a cross section of the door sash position switching means.
Figure 9:
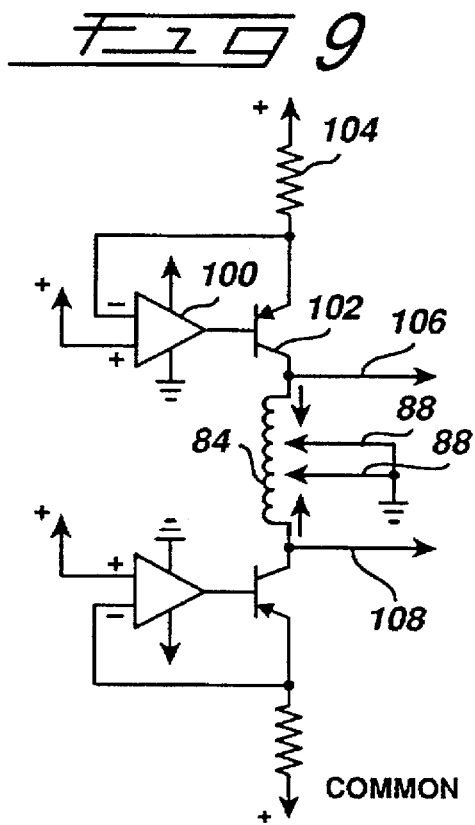
FIG. 9 is a schematic diagram of electrical circuitry for determining the position of sash doors of a fume hood.

To determine the position of the sash doors, a sash position sensor is provided adjacent each movable sash door and it is generally illustrated in FIGS. 7, 8 and 9. Referring to FIG. 8, the door sash position sensor comprises an elongated switch mechanism 80 of relatively simple mechanical design which preferably consists of a relatively thin polyester base layer 82 upon which is printed a strip of electrically resistive ink 84 of a known constant resistance per unit length. Another polyester base layer 86 is provided and it has a strip of electrically conductive ink 88 printed on it. The two base layers 82 and 86 are adhesively bonded to one another by two beads of adhesive 90 located on opposite sides of the strip. The base layers are preferably approximately five-thousandths of an inch thick and the beads are approximately two-thousandths of an inch thick, with the beads providing a spaced area between the conductive and resistive layers 88 and 84. The switching mechanism 80 is preferably applied to the fume hood by a layer of adhesive 92.

The polyester material is sufficiently flexible to enable one layer to be moved toward the other so that contact is made in response to a preferably spring biased actuator 94 carded by the appropriate sash door to which the strip is placed adjacent to so that when the sash door is moved, the actuator 94 moves along the switching mechanism 80 and provides contact between the resistive and conductive layers which are then sensed by electrical circuitry to be described which provides a voltage output that is indicative of the position of the actuator 94 along the length of the switching means. Stated in other words, the actuator 94 is carried by the door and therefore provides an electrical voltage that is indicative of the position of the sash door.

The actuator 94 is preferably spring biased toward the switching mechanism 80 so that as the door is moved, sufficient pressure is applied to the switching means to bring the two base layers together so that the resistive and conductive layers make electrical contact with one another and if this is done, the voltage level is provided. By having the switching means 80 of sufficient length so that the full extent of the travel of the sash door is provided as shown in FIG. 3, then an accurate determination of the sash position can be made.

It should be understood that the illustration of the switching mechanism 80 in FIGS. 3 and 5 is intended to be diagrammatic, in that the switching mechanism is preferably actually located within the sash frame itself and accordingly would not be visible as shown. The width and thickness dimensions of the switching mechanism are so small that there is little interference with the operation of the sash door. The actuator 94 can also be placed in a small hole that may be drilled in the sash door or it may be attached externally at one end thereof so that it can be in position to operate the switch 80. In the vertical moveable sash doors shown in FIGS. 3 and 6, a switching mechanism 80 is preferably provided in one or the other of the sides of the sash frame, whereas in the fume hoods having horizontally movable doors, it is preferred that the switching mechanism 80 be placed in the top of the tracks 68 so that the switching mechanism 80 is out of the operator's way.

Turning to FIG. 9, the preferred electrical circuitry which generates the position indicating voltage is illustrated, and this circuitry is adapted to provide two separate voltages indicating the position of two sash doors in a single track. With respect to the cross-section shown in FIG. 5, there are two horizontal tracks, each of which carries two sash doors and a switching mechanism 80 is provided for each of the tracks as is a circuit as shown in FIG. 9, thereby providing a distinct voltage for each of the four sash doors as shown.

The switching means is preferably applied to the fume hood with a layer of adhesive 92 and the actuator 94 is adapted to bear upon the switching means at locations along the length thereof. Referring to FIG. 7, a diagrammatic illustration of a pair of switching means is illustrated such as may occur with respect to the two tracks shown in FIG. 5. A switching mechanism 80 is provided with each track and the four arrows illustrated represent the point of contact created by the actuators 94 which result in a signal being applied on each of the ends of each switching means, with the magnitude of the signal representing a voltage that is proportional to the distance between the end and the nearest arrow. Thus, a single switching mechanism 80 is adapted to provide position indicating signals for two doors located in each track. The circuitry that is used to accomplish the voltage generation is shown in FIG. 9 and includes one of these circuits for each track. The resistive element is shown at 84 and the conductive element 88 is also illustrated being connected to ground with two arrows being illustrated, and represented the point of contact between the resistive and conductive elements caused by each of the actuators 94 associated with the two separate doors. The circuitry includes an operational amplifier 100 which has its output connected to the base of a PNP transistor 102, the emitter of which is connected to a source of positive voltage through resistor 104 into the negative input of the operational amplifier, the positive input of which is also connected to a source of positive voltage of preferably approximately five volts. The collector of the transistor 102 is connected to one end of the resistive element 84 and has an output line 106 on which the voltage is produced that is indicative of the position of the door.

The circuit operates to provide a constant current directed into the resistive element 84 and this current results in a voltage on line 106 that is proportional to the resistance value between the collector and ground which changes as the nearest point of contact along the resistance changes. The operational amplifier operates to attempt to drive the negative input to equal the voltage level on the positive input and this results in the current applied at the output of the operational amplifier varying in direct proportion to the effective length of the resistance strip 84. The lower portion of the circuitry operates the same way as that which has been described and it similarly produces a voltage on an output line 108 that is proportional to the distance between the connected end of the resistance element 84 and the point of contact that is made by the actuator 94 associated with the other sash door in the track.

Figure 10C:
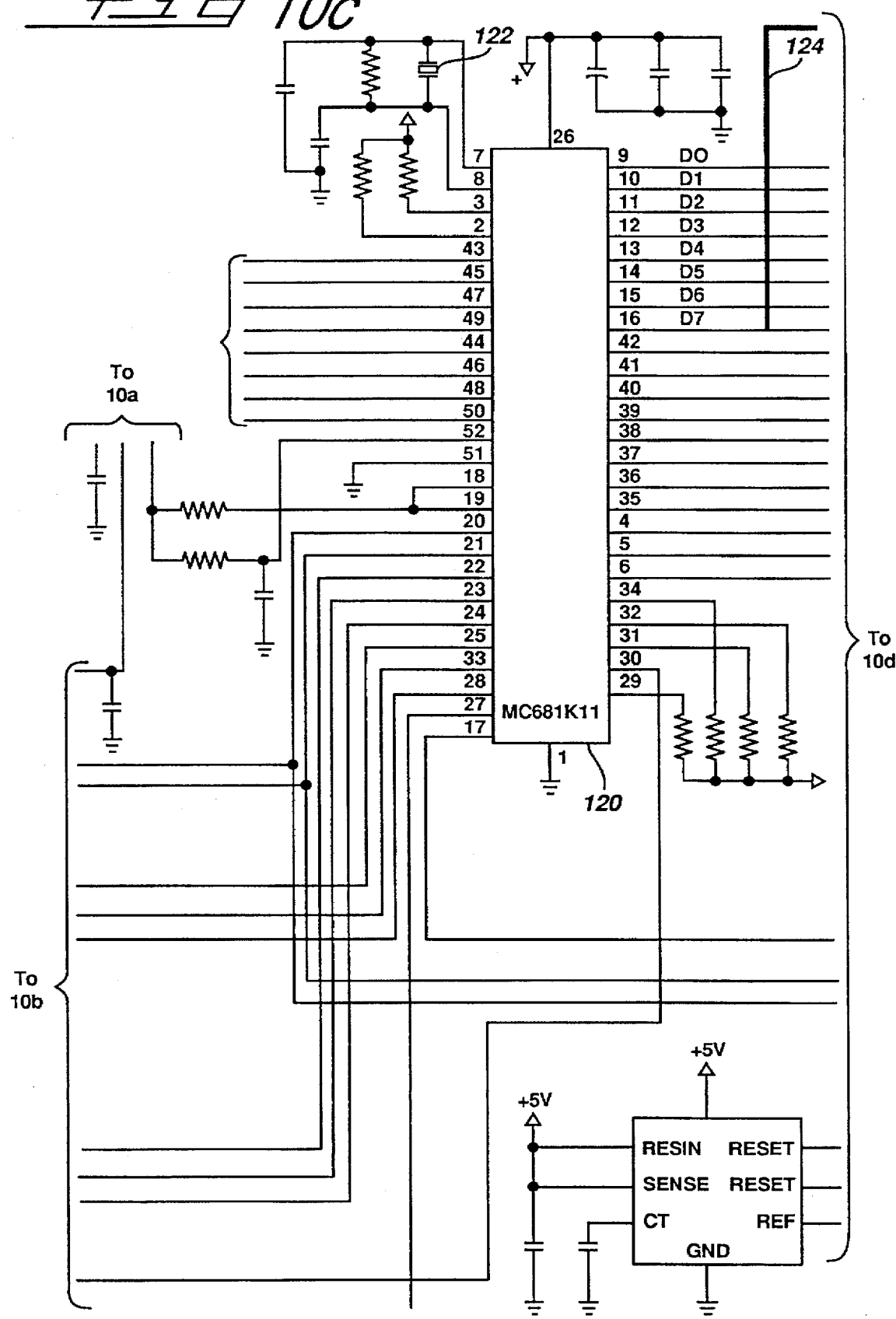
FIG. 10 is a block diagram illustrating the relative positions of FIGS. 10a, 10b, 10c, 10d and 10e to one another, and which together comprise a schematic diagram of the electrical circuitry for the fume hood controller means embodying the present invention.
Figure 10D:
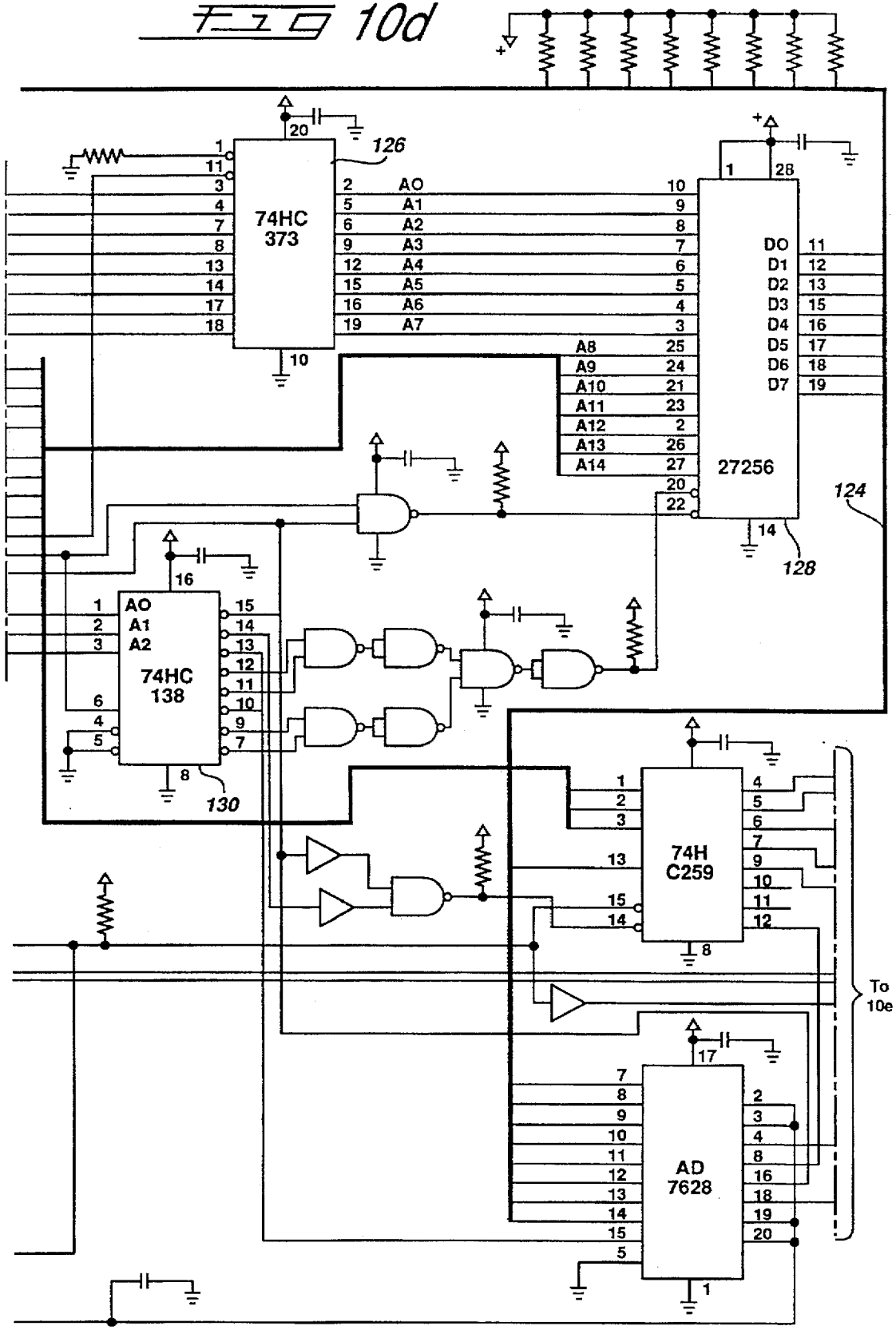
Figure 10E:
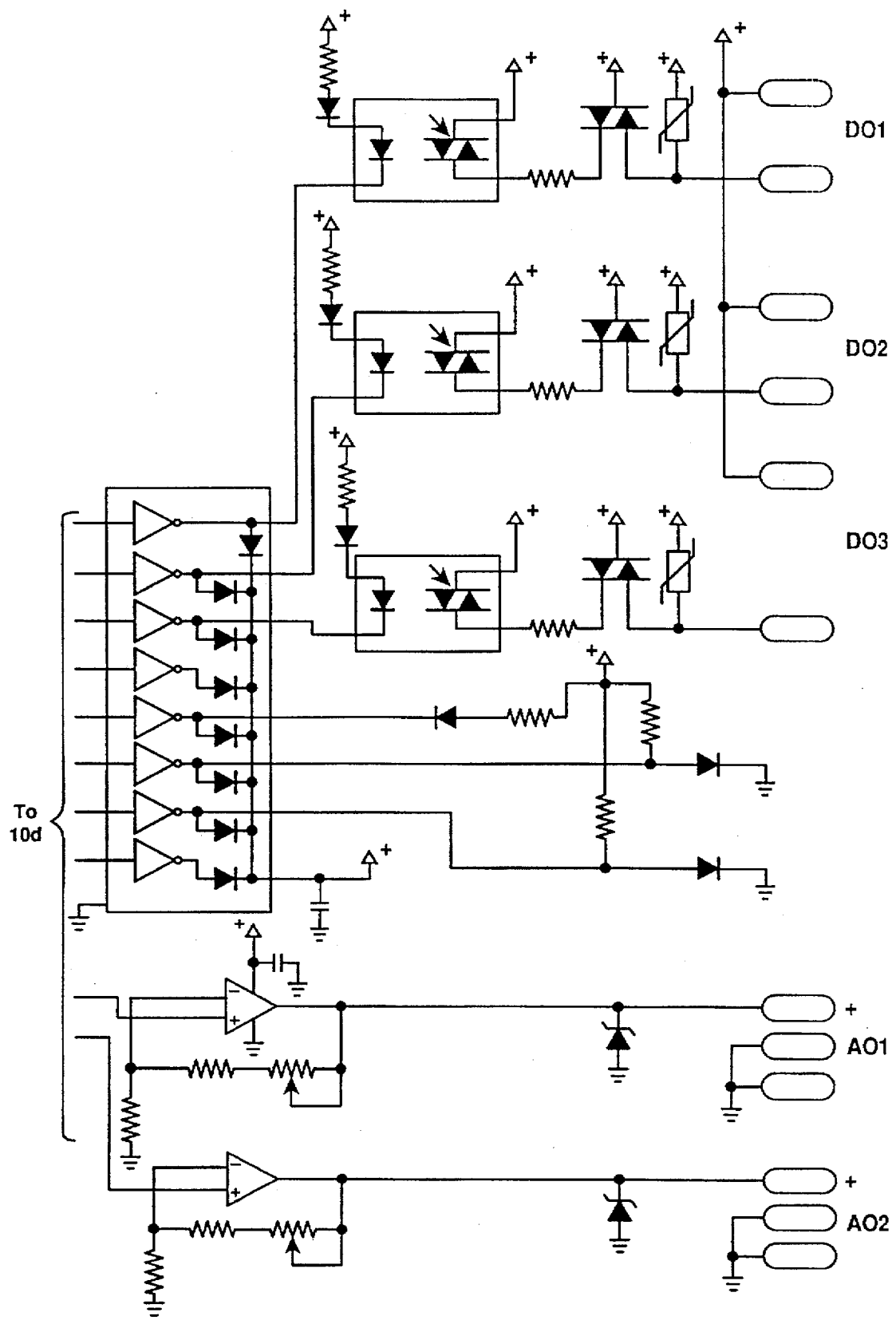

Referring to the composite electrical schematic diagram of the circuitry of the fume hood controller, if the separate drawings FIGS. 10a, 10b, 10c, 10d and 10e are placed adjacent one another in the manner shown in FIG. 10, the total electrical schematic diagram of the fume hood controller 20 is illustrated. The operation of the circuitry of FIGS. 10a through 10e will not be described in detail. The circuitry is driven by a microprocessor and the important algorithms that carry out the control functions of the controller will be hereinafter described. Referring to FIG. 10c, the circuitry includes a Motorola MC 68HC11 microprocessor 120 which is clocked at 8 MHz by a crystal 122. The microprocessor 120 has a databus 124 that is connected to a tri-state buffer 126 (FIG. 10d) which in turn is connected to an electrically programmable read only memory 128 that is also connected to the databus 124. The EPROM 128 has address lines A0 through A7 connected to the tri-state buffer 126 and also has address lines A8 through A14 connected to the microprocessor 120.

The circuitry includes a 3 to 8-bit multiplexer 130, a data latch 132 (see FIG. 10d), a digital-to-analog converter 134, which is adapted to provide the analog outputs indicative of the volume of air being exhausted by the fume hood, which information is provided to room controller 22 as has been previously described with respect to FIG. 2. Referring to FIG. 10b, an RS232 driver 136 is provided for transmitting and receiving information through the hand held terminal. The circuitry illustrated in FIG. 9 is also shown in the overall schematic diagrams and is in FIGS. 10a and 10b. The other components are well known and therefore need not be otherwise described.

As previously mentioned, the monitoring apparatus of the present invention is particularly adapted to be incorporated in a fume hood controller of the type disclosed in U.S. Pat. No. 5,470,275 and in that regard, the specification and drawings relating to that patent are specifically incorporated by reference herein. One of the significant advantages of the present invention is that the controller executes its control scheme in a repetitive and extremely rapid manner. The microprocessor samples flow signal information as well as sash door position signals at a speed of approximately one sample per 100 milliseconds during operation. The result is that rapid responsive control action is accomplished as is desired. Also, by virtue of the speed of sampling of the sash positions, it is possible to calculate the speed of movement of the sashes as they are moved by an operator with extreme accuracy. Also, because of the frequent sampling, the presence of any movement is immediately detected and the speed of movement can be calculated by the microprocessor 120. It should be realized that with the fast clock present in the microprocessor, the speed of movement of any sash door can be calculated virtually within 200 milliseconds. It is preferred that the sensed speed of movement of a sash door during an opening thereof will be compared to a predetermined value, which is approximately 1.5 feet per second. If opening speed of movement of the sash equals or exceeds approximately 1.5 feet per second, then the microprocessor 120 will issue an alarm signal for creating either an audible alarm, a visible alarm or both.

It is preferred that an alarm be an intermittent alarm sound via the alarm 44 which will alert the operator to slow the movement of the sash door during its opening. Alternatively, it may be desirable to illuminate one or more of the visible display characters on the operator panel 34 by blinking them.

It is also within the scope of the present invention that the issuance of the alarm signal may be used to activate a braking force to the sash to slow the movement of the same. The braking force may comprise a pressure applying pad to a surface of the sash, with the pad being connected to a solenoid that is energized by the alarm signal.

It should be understood that with multiple sash doors, movement of any one door can have the effect of increasing or decreasing the uncovered size of the opening, and therefore the calculation of the uncovered size of the opening must be made to determine if the movement is increasing the size of the opening or not. However, for multiple sash door fume hoods, it is within the scope of the present invention to generate an alarm whenever one of the doors is moved at a fast speed even if the size of the opening is not increasing.

From the foregoing detailed description, it should be appreciated that a fume hood controller has been shown and described that has superior capabilities in being able to accurately monitor the speed of movement of one or more sash doors of a laboratory fume hood, and generate an alarm if the speed of movement equals or exceeds a predetermined value. The alarm alerts an operator that the opening of the sash door should be slowed to minimize the possibility of creating a leakage condition.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for determining the speed of movement of at least one sash door of a laboratory fume hood of the type which has an access opening and at least one moveable sash door adapted to vary the size of the opening as the fume hood sash door is moved, said apparatus comprising:

means for detecting the position of each moveable sash door and generating a position signal that is indicative of the sash door position;

means responsive to said position signals for calculating the speed of movement of said sash door and for generating an alarm signal in response to said calculated speed exceeding a predetermined value.

2. Apparatus as defined in claim 1 wherein said position signal responsive means comprises processing means adapted to calculate sash door movement velocity utilizing changes in said detected position.

3. Apparatus as defined in claim 2 wherein said processing means is adapted to calculate the direction of said sash door movement velocity and to generate said alarm signal in response to said calculated speed exceeding a predetermined value in an opening direction.

4. Apparatus as defined in claim 1 further including means for generating an alarm in response to said alarm signal being generated.

5. Apparatus as defined in claim 4 wherein said alarm is an audible alarm.

6. Apparatus as defined in claim 4 wherein said alarm is a visual alarm.

7. Apparatus as defined in claim 4 wherein said alarm is an intermittent alarm.

8. Apparatus for controlling a flow control means for controlling the air flow through a fume hood to maintain a predetermined average face velocity through an uncovered portion of a face opening of a fume hood of the type which has at least one moveable sash door adapted to cover the opening as the fume hood sash door is moved, the fume hood being in communication with an exhaust duct for expelling air and fumes from the fume hood, said apparatus comprising:

means for determining the position of each of said sash doors and generating signals indicative thereof;

processing means for determining the size of the uncovered face opening responsive to said generated position signals;

said processing means calculating the size of said opening and determining whether the size is increasing in response to movement of at least one of said sash doors;

said processing means calculating the speed of movement of said sash doors and generating an alarm signal when said calculated speed exceeds a predetermined value.

9. Apparatus as defined in claim 8 wherein said processing means generates said alarm signal when said calculated speed exceeds said predetermined value and said detected movement increases the uncovered size of said opening.

10. Apparatus as defined in claim 8 further including means for generating an alarm in response to said alarm signal being generated.

11. Apparatus as defined in claim 8 wherein said alarm is an audible alarm.

12. Apparatus as defined in claim 8 wherein said alarm is a visible alarm.

13. Apparatus as defined in claim 8 wherein said alarm is intermittent.

* * * * *